US011285632B2

(12) United States Patent
Zimmermann et al.

(10) Patent No.: US 11,285,632 B2
(45) Date of Patent: *Mar. 29, 2022

(54) AUGER

(71) Applicant: MILWAUKEE ELECTRIC TOOL CORPORATION, Brookfield, WI (US)

(72) Inventors: Michael J. Zimmermann, New Berlin, WI (US); Neil A. Lofy, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/923,806

(22) Filed: Jul. 8, 2020

(65) Prior Publication Data

US 2020/0338784 A1 Oct. 29, 2020

Related U.S. Application Data

(63) Continuation of application No. 16/355,455, filed on Mar. 15, 2019, now Pat. No. 10,744,671.

(Continued)

(51) Int. Cl.
*B27G 15/00* (2006.01)

(52) U.S. Cl.
CPC ........ *B27G 15/00* (2013.01); *B23B 2251/408* (2013.01); *B23B 2251/60* (2013.01); *Y10T 408/901* (2015.01); *Y10T 408/902* (2015.01)

(58) Field of Classification Search
CPC .. B27G 15/00; Y10T 408/901; Y10T 408/902
See application file for complete search history.

(56) References Cited

U.S. PATENT DOCUMENTS

| | | | |
|---|---|---|---|
| 5,036 | A | 3/1847 | Newton et al. |
| 6,221 | A | 3/1849 | Sanford |

(Continued)

FOREIGN PATENT DOCUMENTS

| | | |
|---|---|---|
| AT | 506032 A1 | 5/2009 |
| CN | 301047635D | 10/2009 |

(Continued)

OTHER PUBLICATIONS

Hilti, Product Catalog (Drill Bits), published Jul. 2014 (17 Pages).

(Continued)

*Primary Examiner* — Eric A. Gates
(74) *Attorney, Agent, or Firm* — Michael Best & Friedrich LLP

(57) ABSTRACT

An auger includes a body having a first end, a second end, a stem that defines an axis of rotation, and a flute helically wrapped around the stem. The auger also includes a shank at the first end of the body and a cutting head at the second end of the body. The cutting head includes a cutting edge, a cutting face adjacent the cutting edge, and a back taper surface extending from the cutting edge in a direction opposite the cutting face. The back taper surface defines a back taper angle between an axis perpendicular to the axis of rotation and the back taper surface. The back taper angle is a non-zero angle. The cutting head further includes a feed screw extending from the stem along. The feed screw includes a thread having a pitch and a depth. The pitch is larger than the depth of the thread.

19 Claims, 6 Drawing Sheets

Related U.S. Application Data

(60) Provisional application No. 62/645,865, filed on Mar. 21, 2018.

(56) References Cited

U.S. PATENT DOCUMENTS

| | | | |
|---|---|---|---|
| 290,812 A | 12/1883 | Swan | |
| 400,659 A | 4/1889 | Gerard | |
| 1,004,902 A | 10/1911 | Potter | |
| 1,025,109 A | 4/1912 | Butler | |
| 1,417,760 A | 5/1922 | McPherson | |
| 1,984,839 A | 12/1934 | Murray | |
| 2,358,077 A | 9/1944 | Koett | |
| 3,726,014 A | 4/1973 | Weissman | |
| 3,850,054 A | 11/1974 | Weissman | |
| 4,536,107 A | 8/1985 | Sandy et al. | |
| 5,358,209 A | 10/1994 | Ward | |
| D390,239 S | 2/1998 | Malin | |
| 5,820,319 A | 10/1998 | Hull et al. | |
| D408,424 S | 4/1999 | Schmotzer | |
| 5,975,813 A * | 11/1999 | Schmotzer | B27G 15/00 408/214 |
| 6,361,255 B1 | 3/2002 | Schmotzer | |
| D504,446 S | 4/2005 | Kobayashi | |
| 7,033,363 B2 | 4/2006 | Powell | |
| D520,537 S | 5/2006 | Cardew | |
| D559,874 S | 1/2008 | Kobayashi | |
| D580,462 S | 11/2008 | Liao et al. | |
| D585,920 S | 2/2009 | Liao et al. | |
| D589,319 S | 3/2009 | Peters | |
| D594,306 S | 6/2009 | Decker | |
| D609,073 S | 2/2010 | Lin | |
| D612,875 S | 3/2010 | Beynon | |
| D627,807 S | 11/2010 | Tosti | |
| D664,167 S | 7/2012 | Lampe | |
| D678,369 S | 3/2013 | Santamarina | |
| D682,897 S | 5/2013 | Evatt | |
| D682,899 S | 5/2013 | Evatt | |
| D687,871 S | 8/2013 | Liao et al. | |
| D689,755 S | 9/2013 | Quinn et al. | |
| D699,089 S | 2/2014 | Quinn et al. | |
| D709,111 S | 7/2014 | Liao et al. | |
| 8,784,017 B2 | 7/2014 | Ibarra et al. | |
| 8,974,466 B2 | 3/2015 | Powell | |
| D734,792 S | 7/2015 | Santamarina et al. | |
| 9,113,916 B2 | 8/2015 | Lozier et al. | |
| D737,875 S | 9/2015 | Santamarina et al. | |
| D750,674 S | 3/2016 | Dunnahoe | |
| 9,480,488 B2 | 11/2016 | Powell | |
| 9,500,038 B2 * | 11/2016 | Neitzell | E21B 10/44 |
| D774,868 S | 12/2016 | Ouyang | |
| D859,483 S | 9/2019 | Zimmermann et al. | |
| 10,744,671 B2 * | 8/2020 | Zimmermann | B27G 15/00 |
| 10,940,545 B2 * | 3/2021 | Kulig | B23B 51/02 |
| D923,674 S | 6/2021 | Zimmermann et al. | |
| 2003/0035694 A1 | 2/2003 | Liao | |
| 2004/0052594 A1 | 3/2004 | Singh | |
| 2005/0126829 A1 | 6/2005 | Meierhofer et al. | |
| 2005/0169720 A1 | 8/2005 | Kobayashi | |
| 2008/0138165 A1 | 6/2008 | Durfee | |
| 2009/0148250 A1 | 6/2009 | Chappell et al. | |
| 2010/0135741 A1 | 6/2010 | Probst et al. | |
| 2011/0207081 A1 | 8/2011 | Jensen | |
| 2011/0318129 A1 | 12/2011 | Piper | |
| 2013/0319774 A1 | 12/2013 | Hammer et al. | |
| 2015/0016906 A1 | 1/2015 | York | |
| 2016/0375500 A1 | 12/2016 | Kaye, Jr. et al. | |

FOREIGN PATENT DOCUMENTS

| | | |
|---|---|---|
| CN | 301095647D | 12/2009 |
| CN | 301175430 S | 4/2010 |
| CN | 301175432 S | 4/2010 |
| CN | 301306733 S | 8/2010 |
| CN | 301342024 S | 9/2010 |
| CN | 301391013 S | 11/2010 |
| CN | 301397040 S | 12/2010 |
| CN | 301397042 S | 12/2010 |
| CN | 301512237 S | 4/2011 |
| CN | 301512238 S | 4/2011 |
| CN | 301512239 S | 4/2011 |
| CN | 301812448 S | 1/2012 |
| CN | 301843893 S | 2/2012 |
| CN | 301946238 S | 6/2012 |
| CN | 302027884 S | 8/2012 |
| CN | 302027885 S | 8/2012 |
| CN | 302027886 S | 8/2012 |
| CN | 302027887 S | 8/2012 |
| CN | 302229164 S | 12/2012 |
| CN | 302439550 S | 5/2013 |
| CN | 302452086 S | 6/2013 |
| CN | 302464728 S | 6/2013 |
| CN | 302540717 S | 8/2013 |
| CN | 302678598 S | 12/2013 |
| CN | 302678599 S | 12/2013 |
| CN | 302678600 S | 12/2013 |
| CN | 302678601 S | 12/2013 |
| CN | 302678603 S | 12/2013 |
| CN | 303080433 S | 1/2014 |
| CN | 302972022 S | 10/2014 |
| CN | 303080386 S | 1/2015 |
| CN | 303616300 S | 3/2016 |
| CN | 303735467 S | 7/2016 |
| CN | 303787577 S | 8/2016 |
| CN | 303787578 S | 8/2016 |
| CN | 303924689 S | 11/2016 |
| EM | 000004163-0002 | 7/2003 |
| EM | 000130034-0001 | 4/2004 |
| EM | 000192158-0001 | 9/2004 |
| EM | 000210646-0001 | 11/2004 |
| EM | 000210646-0002 | 11/2004 |
| EM | 000210646-0003 | 11/2004 |
| EM | 000210646-0004 | 11/2004 |
| EM | 000159488-0001 | 6/2005 |
| EM | 000159488-0002 | 6/2005 |
| EM | 000768353-0001 | 8/2007 |
| EM | 000768353-0002 | 8/2007 |
| EM | 000768353-0003 | 8/2007 |
| EM | 000768353-0004 | 8/2007 |
| EM | 000768353-0005 | 8/2007 |
| EM | 000768353-0006 | 8/2007 |
| EM | 000917489-0001 | 5/2008 |
| EM | 000917489-0002 | 5/2008 |
| EM | 000917489-0004 | 5/2008 |
| EM | 000917489-0005 | 5/2008 |
| EM | 000920681-0001 | 5/2008 |
| EM | 000920681-0002 | 5/2008 |
| EM | 000931795-0001 | 6/2008 |
| EM | 000931795-0002 | 6/2008 |
| EM | 000931795-0003 | 6/2008 |
| EM | 000931795-0004 | 6/2008 |
| EM | 000956792-0001 | 7/2008 |
| EM | 000956792-0002 | 7/2008 |
| EM | 001051494-0003 | 1/2009 |
| EM | 001051494-0004 | 1/2009 |
| EM | 0010365003-003 | 1/2009 |
| EM | 0010365003-004 | 1/2009 |
| EM | 000925201-0001 | 5/2010 |
| EM | 000925201-0002 | 5/2010 |
| EM | 000925201-0003 | 5/2010 |
| EM | 000925201-0004 | 5/2010 |
| EM | 000925201-0005 | 5/2010 |
| EM | 000925201-0006 | 5/2010 |
| EM | 001745712-0001 | 9/2010 |
| EM | 001745712-0002 | 9/2010 |
| EM | 001812835-0001 | 2/2011 |
| EM | 001812835-0002 | 2/2011 |
| EM | 001866955-0001 | 5/2011 |
| EM | 001866955-0002 | 5/2011 |
| EM | 001903592-0004 | 8/2011 |
| EM | 001903592-0005 | 8/2011 |
| EM | 001903592-0006 | 8/2011 |
| EM | 001936428-0001 | 10/2011 |
| EM | 001936428-0002 | 10/2011 |

(56) References Cited

FOREIGN PATENT DOCUMENTS

| | | |
|---|---|---|
| EM | 001936428-0004 | 10/2011 |
| EM | 001936428-0005 | 10/2011 |
| EM | 002018309-0001 | 4/2012 |
| EM | 002018309-0002 | 4/2012 |
| EM | 002024570-0001 | 4/2012 |
| EM | 001980681-0003 | 5/2012 |
| EM | 002001735-0001 | 7/2012 |
| EM | 002285510-0001 | 8/2013 |
| EM | 002285510-0002 | 8/2013 |
| EM | 001382840-0001 | 11/2013 |
| EM | 001382840-0002 | 11/2013 |
| EM | 001382840-0003 | 11/2013 |
| EM | 001382840-0004 | 11/2013 |
| EM | 001382840-0005 | 11/2013 |
| EM | 001382840-0006 | 11/2013 |
| EM | 001382840-0007 | 11/2013 |
| EM | 001382840-0008 | 11/2013 |
| EM | 001407118-0001 | 4/2014 |
| EM | 001407118-0002 | 4/2014 |
| EM | 001407118-0003 | 4/2014 |
| EM | 001407118-0004 | 4/2014 |
| EM | 001407118-0005 | 4/2014 |
| EM | 001407118-0006 | 4/2014 |
| EM | 001407118-0007 | 4/2014 |
| EM | 001407118-0008 | 4/2014 |
| EM | 003099431-0001 | 7/2016 |
| EM | 003099431-0002 | 7/2016 |
| EM | 003099431-0003 | 7/2016 |
| EM | 003099431-0004 | 7/2016 |
| EP | 1750597 B1 | 12/2010 |
| GB | 1568013 A | 5/1980 |
| WO | WO2013140121 | 9/2013 |
| WO | WODM083624 | 4/2014 |
| WO | WODM084087 | 7/2014 |
| WO | WODM088075 | 10/2015 |

OTHER PUBLICATIONS

You Tube Video, Slow Motion footage of Hilti hammer drill bits for concrete & masonry—YouTube, Published Jul. 7, 2013.

\* cited by examiner

AUGER

CROSS REFERENCE TO RELATED APPLICATIONS

This application is a continuation of U.S. patent application Ser. No. 16/355,455 filed Mar. 15, 2019, now U.S. Pat. No. 10,744,671, which claims priority to U.S. Provisional Patent Application No. 62/645,865 filed Mar. 21, 2018, the entire contents of which are incorporated by reference herein.

BACKGROUND

The present invention relates to augers and, in particular, to augers for cutting holes in workpieces.

Augers are typically used with power tools, such as, for example, a drill, a driver drill, an impact driver, and the like to cut or carve holes into a material or surface, such as, for example, wood, composites, and the like. It is desired for augers to cut at faster speeds to minimize the amount of time drilling into a workpiece. In addition, rotating at faster speeds produces a cleaner cutting hole.

SUMMARY

In one embodiment, the invention provides an auger including a body with a first end, a second end opposite the first end, a stem that extends from the first end to the second end and defines an axis of rotation, and a flute helically wrapped around the stem. The auger further includes a shank at the first end of the body configured to be received by a power tool and a cutting head at the second end of the body. The cutting head includes a cutting edge, a spur, and a feed screw with a thread. The thread has a pitch and a nonsymmetrical thread profile. The pitch of the thread is at least 2.5 mm.

In another embodiment, the invention provides an auger including a body with a first end, a second end opposite the first end, a stem that extends from the first end to the second end and defines an axis of rotation, and a flute helically wrapped around the stem. The auger further includes a shank at the first end of the body configured to be received by a power tool and a cutting head at the second end of the body. The cutting head includes a cutting edge, a cutting face adjacent the cutting edge, a spur, and a feed screw with a thread. The cutting face includes a first surface portion extending from the cutting edge toward the flute and a second surface portion extending from the first surface portion to the flute. A primary angle measured between the first surface portion and a plane defined by the cutting edge and the axis of rotation is greater than a secondary angle measured between the second surface portion and the plane. The flute has a pitch in a range between 30 mm and 70 mm and a width measured in a direction parallel to the axis of rotation in a range between 25 mm and 50 mm.

In another embodiment, the invention provides an auger including a body with a first end, a second end opposite the first end, a stem that extends from the first end to the second end and defines an axis of rotation, and a flute helically wrapped around the stem. The auger further includes a shank at the first end of the body configured to be received by a power tool and a cutting head at the second end of the body. The cutting head includes a cutting edge formed on an edge of the flute at the second end of the body, a spur extending from the second end of the body on a diametrically opposite side of the axis of rotation from the cutting edge, and a feed screw positioned between the cutting edge and the spur. The feed screw includes a base connected to the stem, a tip opposite the base, and a thread. The spur extends from the flute past the base of the feed screw. The spur extends axially past the cutting edge a distance equal to at half a pitch of the thread of the feed screw.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-7 illustrate an auger 10 for use with a power tool, such as, for example, a drill, a driver drill, an impact driver, and the like. The auger 10 may be used to cut holes or drill into a workpiece such as wood and the like. In some particular applications, the workpiece can be a power utility pole. The illustrated auger 10 comes in a variety of sizes that correspond to the diameter of a hole to be created in a workpiece. For example, possible sizes of the auger 10 may be ⅜", ½", 9/16", ⅝", 11/16", ¾", 13/16", ⅞", 15/16", 1", 1 1/16", 1⅛", and 1¼". In other embodiments, the auger 10 may be other sizes.

Figure 1:
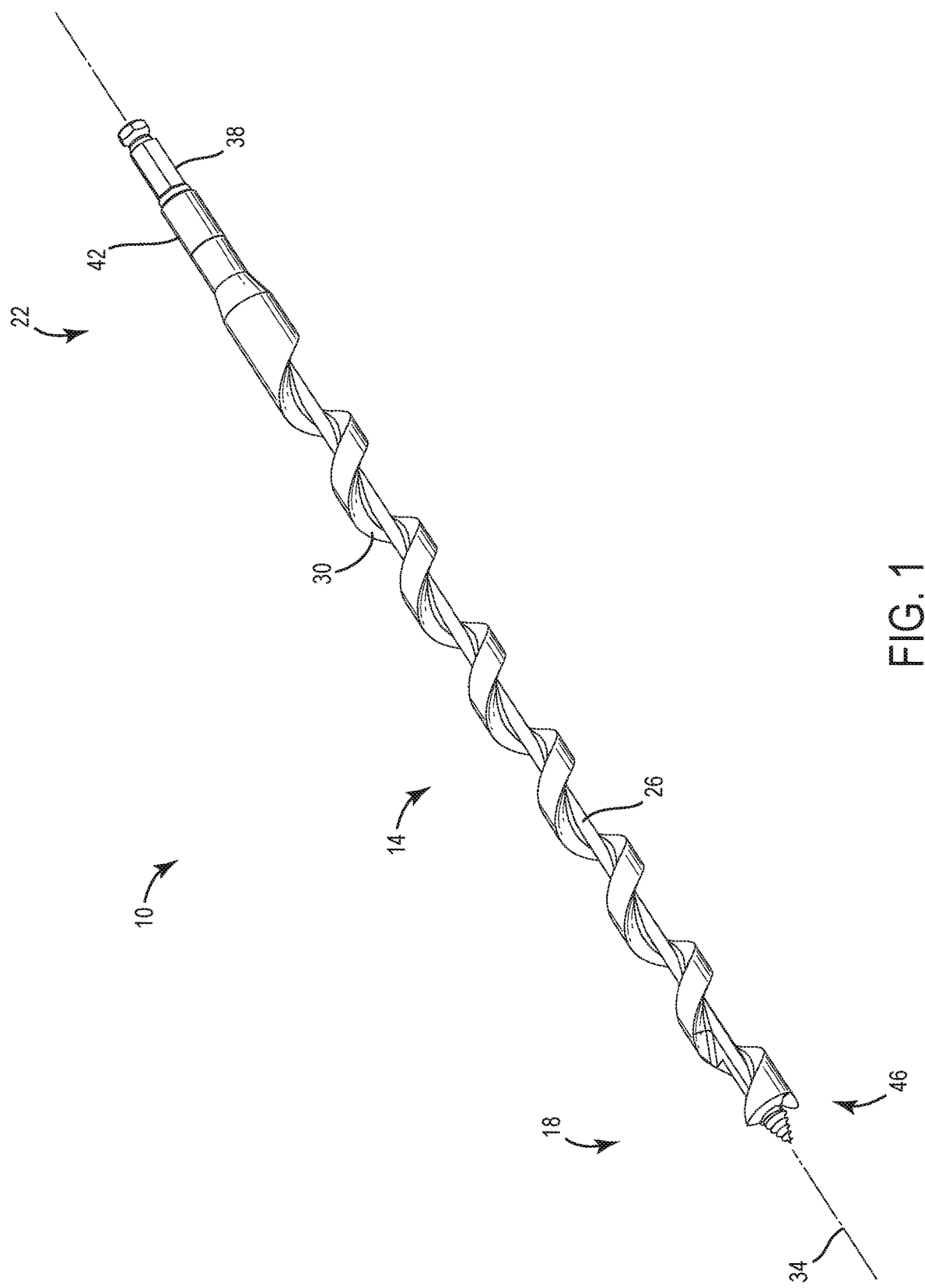
FIG. 1 is a perspective view of an auger.

With reference to FIG. 1, the auger 10 includes a body 14 having a first or workpiece-engaging end 18, a second or rearward end 22 configured to be received in a tool holder or chuck of a power tool, a stem 26 extending from the first end 18 to the second end 22, and a flute 30. The auger 10 may come in a variety of different lengths defined between the first and second ends 18, 22. In some embodiments, the length of the auger may be 18", 24" or 30" although other lengths are possible. The stem 26 defines an axis of rotation 34 that the auger 10 rotates about during a drilling operation. The flute 30 is helically wrapped around the stem 26 and extends the full length of the body 14. In the illustrated embodiment, the auger 10 includes a single flute 30. In other embodiments, the auger 10 may include multiple flutes 30. In further embodiments, the auger 10 may not include a flute 30.

With continued reference to FIG. 1, the second end 22 of the auger 10 includes a hex-shaped shaft or shank 38 that is configured to be coupled to the power tool. The shank 38 is approximately one sixth to one tenth the total length of the auger 10. An indication band 42 is located adjacent the shank 38 on the second end 22 of the auger 10. The indication band 42 may indicate to a user the size of the auger 10. The indication band 42 may be a variety of colors such as red, green, blue, purple, orange, yellow, etc.

Figure 2:
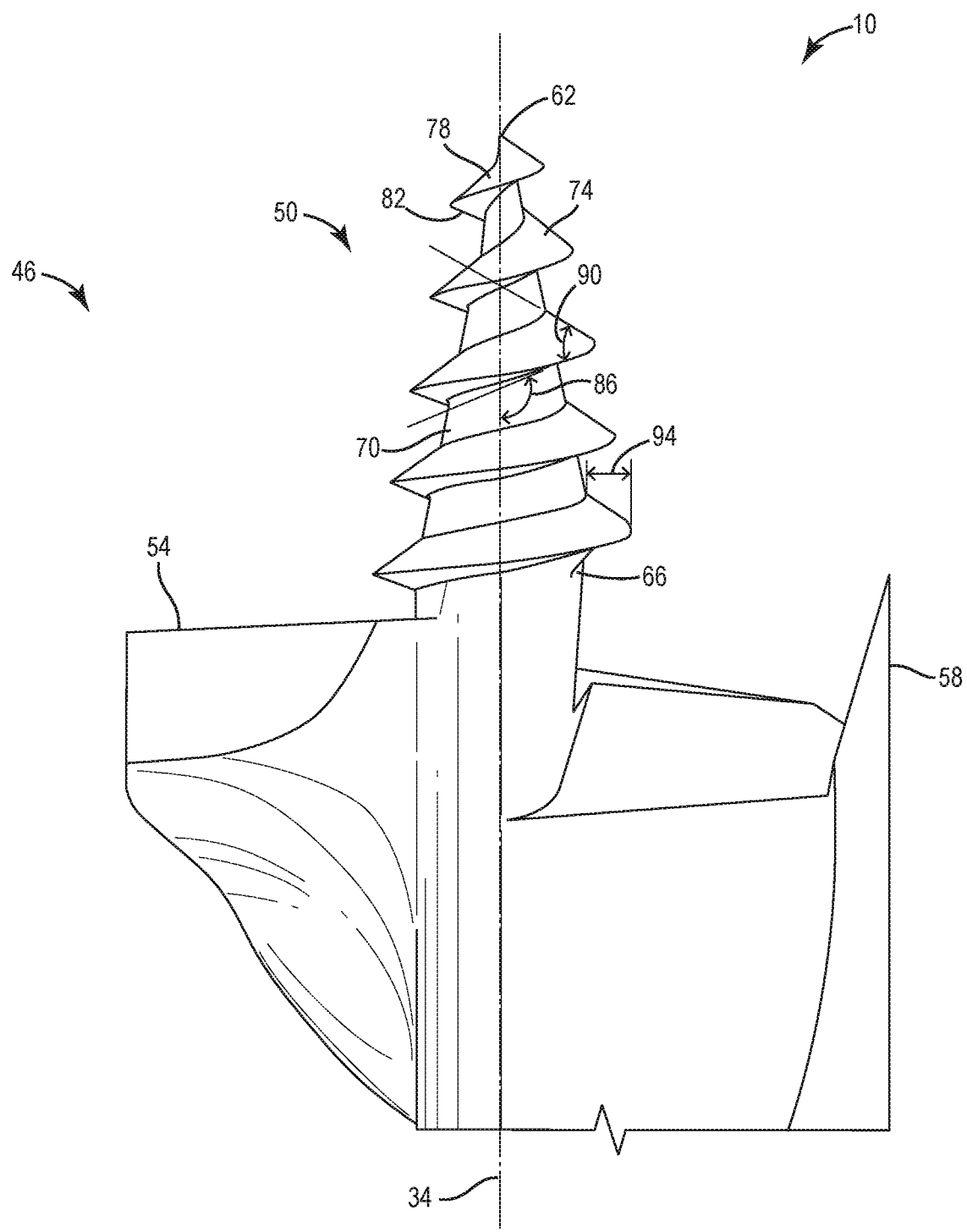
FIG. 2 is a first side view of a cutting head of the auger of FIG. 1.

With reference to FIG. 2, a cutting head 46 is located at the second end 22 of the body 14. The cutting head 46 includes a feed screw 50, a cutting edge 54, and a spur 58. The feed screw 50 extends from the stem 26 and includes a tip 62 at the furthest point of the feed screw 50, a base 66 opposite the tip 62 and adjacent the stem 26, a feed screw surface 70, and a thread 74 that is helically wrapped around the feed screw surface 70 from the base 66 to the tip 62. In the illustrated embodiment, the feed screw 50 includes a single thread 74. In other embodiments, the feed screw 50 may include more than one thread 74. In further embodiments, the base 66 of the feed screw 50 has a diameter between 6 mm and 8 mm and the length of the feed screw is between 10 mm and 16 mm. The thread 74 includes a top surface 78 facing away from the body 14 and a bottom surface 82 facing the body 14. The top and bottom surfaces 78, 82 define a nonsymmetrical profile for the thread 74. In other words, the top surface 78 and bottom surface 82 extend from the feed screw 50 at different angles. The top surface 78 extends obliquely from the feed screw 50, and the bottom surface 82 extends substantially flat from the feed screw 50. The bottom surface 82 of the thread 74 defines an angle 86 with the axis of rotation 34. The substantially flat bottom surface 82 inhibits the thread 74 from losing engagement from a workpiece during a drilling operation. The thread 74 also includes a peak angle 90 defined between the top and bottom surfaces 78, 82 of the thread 74. The peak angle 90 is generally an acute angle and may be within a range between 50 degrees and 70 degrees. The thread 74 includes a depth 94 measured in a direction perpendicular to the axis of rotation 34 from the feed screw surface 70 to a point where the bottom and top surfaces 78, 82 meet. As shown in Table 1 below, the depth 94 of the thread 74 may vary depending on the size of the auger 10.

TABLE 1

| Size | 3/8"-1" | 1-1/16"-1-1/4" |
|---|---|---|
| Depth of Thread | 0.9-1.4 mm | 1.0-1.5 mm |

In addition, the pitch of the thread 74 is larger than the depth 94 of the thread. As shown in Table 2 below, the pitch of the thread 74 may vary depending on the size of the auger 10. In some embodiments, the pitch of the thread may be at least 2.5 mm. In other embodiments, the pitch of the thread is in a range between 2.5 mm and 3 mm.

TABLE 2

| SIZE | 3/8"-5/8" | 11/16-1-1/4" |
|---|---|---|
| Pitch of Thread | 1.7-2.3 mm | 2.2-2.8 mm |

The high pitch of the thread 74 increases the speed of the auger 10 during a drilling operation on a workpiece. The high pitch of the thread 74 also allows for the depth 94 to be increased. Overall, the feed screw 50 of the auger 10 increases the speed of a drilling operation in a workpiece and reduces chipping around the edge of the hole being drilled.

Figure 3:
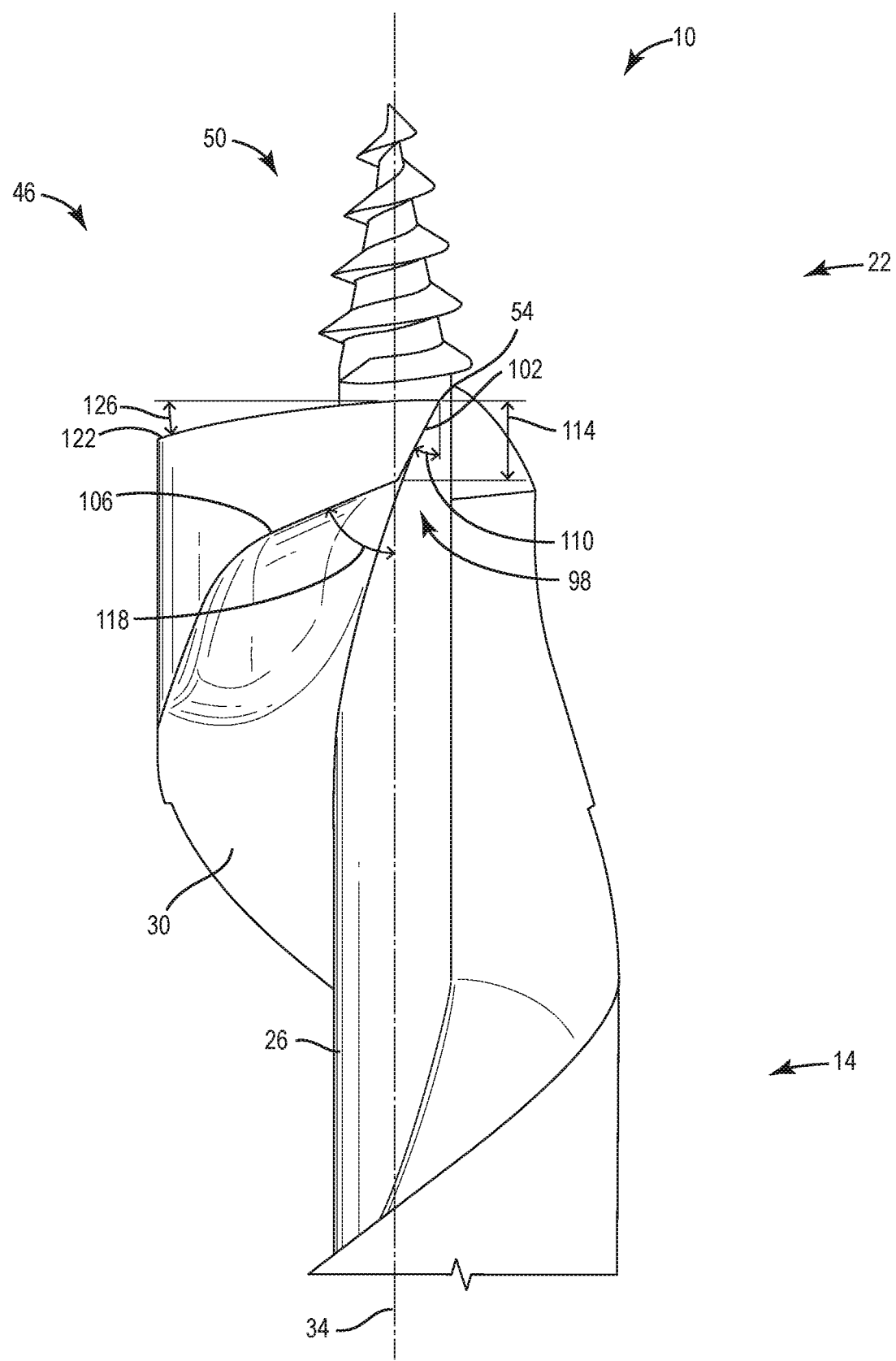
FIG. 3 is a second side view of the cutting head.

With reference to FIG. 3, the cutting edge 54 is positioned on an end of the flute 30 at the second end 22 of the body 14. In some embodiments, the distance between the cutting edge 54 and the base of the feed screw 66 is less than 3 mm. Adjacent the cutting edge 54 is a cutting face 98 that extends from the cutting edge 54 towards the first end 18 of the body 14. The cutting face 98 includes a first surface portion 102 extending from the cutting edge 54 towards the flute 30 and a second surface portion 106 extending from the first surface portion 102 to the flute 30. The first surface portion 102 defines a primary cutting angle 110 measured between the first surface portion 102 and a plane defined by the cutting edge and the axis of rotation 34. The primary cutting angle 110 can be about 31 degrees to about 39 with some embodiments being about 35 degrees. The first surface portion 102 includes a height 114 measured in a direction parallel to the axis of rotation 34. The height 114 of the cutting edge 54 is thin to reduce drag while drilling, but remains durable. The second surface portion 106 provides a smooth transition between the sharp cutting edge 54 and the flute 30. The second surface portion 106 defines a secondary cutting angle 118 measured between the second surface portion 106 and the plane. The secondary cutting angle 118 is at an angle that is approximately twice as big as the primary cutting angle 110. As shown in Table 3 below, the secondary cutting angle 118 may vary depending on the size of the auger 10.

TABLE 3

| Size | 3/8"-11/16" | 11/16"-1-1/4" |
|---|---|---|
| Secondary Cutting Angle | 65°-70° | 70°-75° |

With continued reference to FIG. 3, the cutting head 46 includes a back taper surface 122 extending from the cutting edge 54 in a direction opposite the cutting face 98 along the flute 30. The back taper surface 122 defines a back taper angle 126 between an axis perpendicular to the axis of rotation 34 and the back taper surface 122. The back taper angle 126 is a relatively small non-zero angle. In some embodiments, the minimum back taper angle 126 matches the angle of the feed screw pitch. In other embodiments, the back taper angle 126 is greater than the angle of the feed screw pitch. In some embodiments, the minimum distance between the back taper surface 122 and the second surface portion 106 is 3.5 mm. As shown in Table 4 below, the back taper angle 126 may vary depending on the size of the auger 10.

TABLE 4

| Size | 3/8"-9/16" | 5/8"-3/4" | 13/16"-7/8" | 15/16"-1" | 1-1/16"-1-1/4" |
|---|---|---|---|---|---|
| Back Taper Angle | 9.6°-10° | 9.2°-9.6° | 8.8°-9.2° | 8.5°-8.9° | 8.2°-8.6° |

Figure 4:
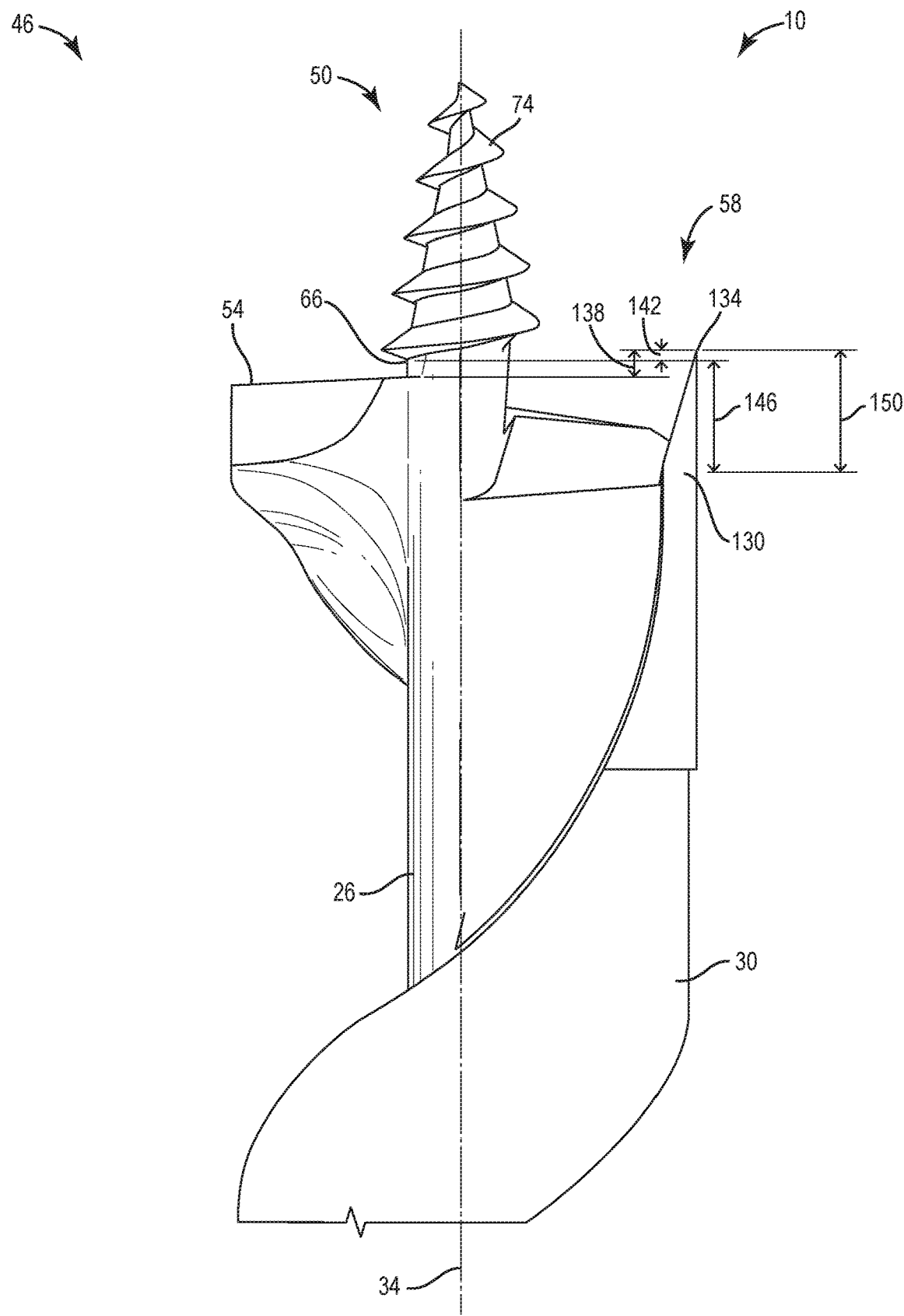
FIG. 4 is a third side view of the cutting head.

Now referring to FIG. 4, the spur 58 extends from the cutting head 46 away from the body 14 on a generally diametrically opposite side of the axis of rotation 34 from the cutting edge 54. The spur 58 is designed to create a clean cutting hole by scoring the hole before the cutting edge 54 begins to remove material. The spur 58 includes a bottom 130 adjacent the cutting head 46 and a top 134 opposite the bottom 130. The top 134 of the spur 58 extends past the cutting edge 54 away from the body 14 in a direction parallel to the axis of rotation 34 by a first distance 138. The first distance 138 is equal to or greater than half of the pitch of the thread 74 of the feed screw 50. In some embodiments, the first distance 138 is in a range of 1 mm to 2 mm. The top 134 of the spur 58 also extends past the base 66 of the feed screw 50 a second distance 142 to reduce the force required for the auger 10 to exit a workpiece during a drilling operation. A third distance 146 between the bottom 130 of the spur 58 and the base 66 of the feed screw 50 is larger than the pitch of the thread 74 of the feed screw 50 to inhibit chips from the workpiece getting stuck during a drilling operation.

The spur 58 also has a height 150 between the bottom 130 of the spur 58 and the top 134 of the spur 58 in a direction parallel to the axis of rotation 34. As shown in Table 5 below, the height 150 of the spur 58 may vary depending on the size of the auger 10.

TABLE 5

| Size | 3/8"-5/8" | 11/16"-1-1/4" |
|---|---|---|
| Height of Spur | 1.1-2.6 mm | 1.5-3 mm |

Figure 5:
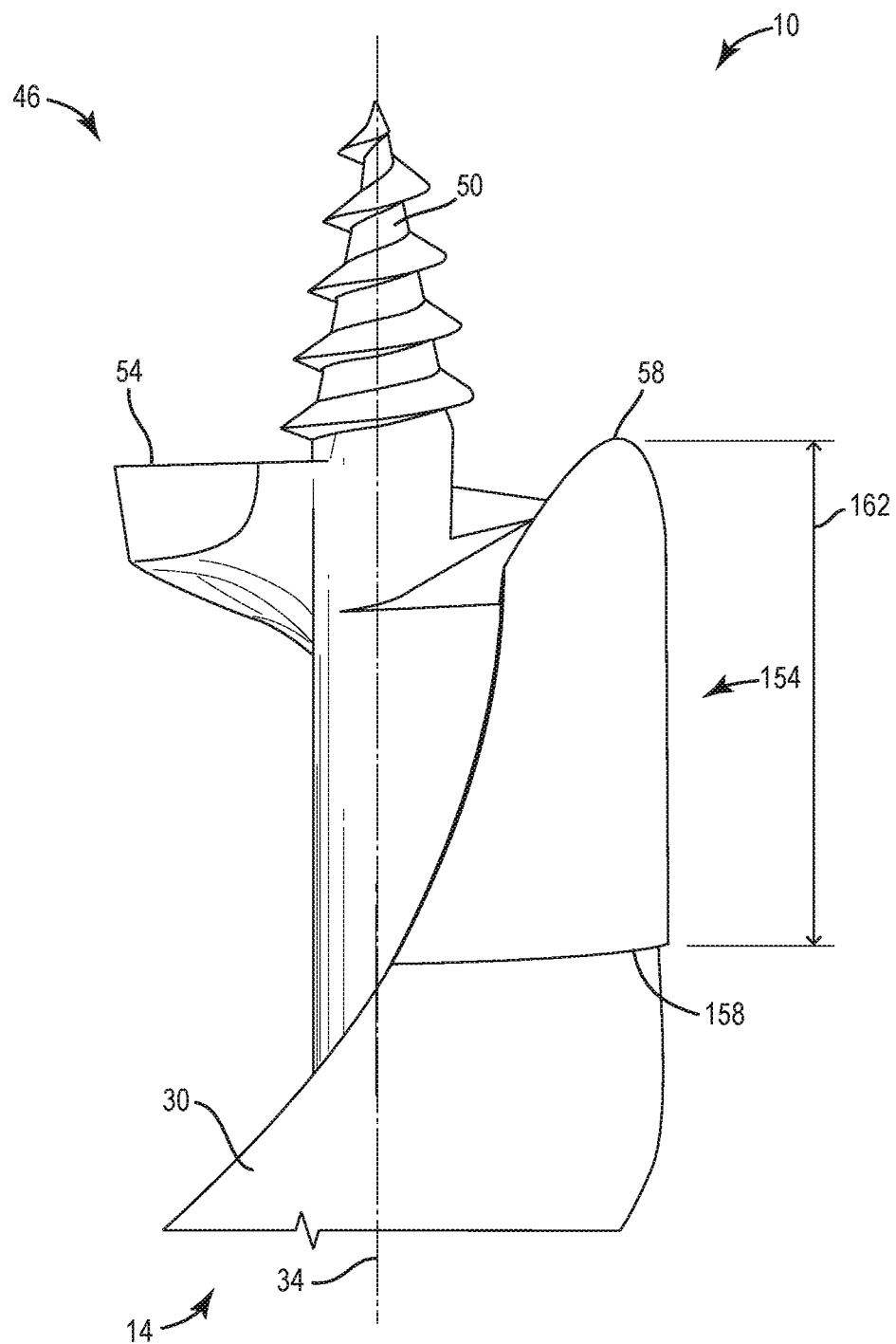
FIG. 5 is a fourth side view of the cutting head.
Figure 6:
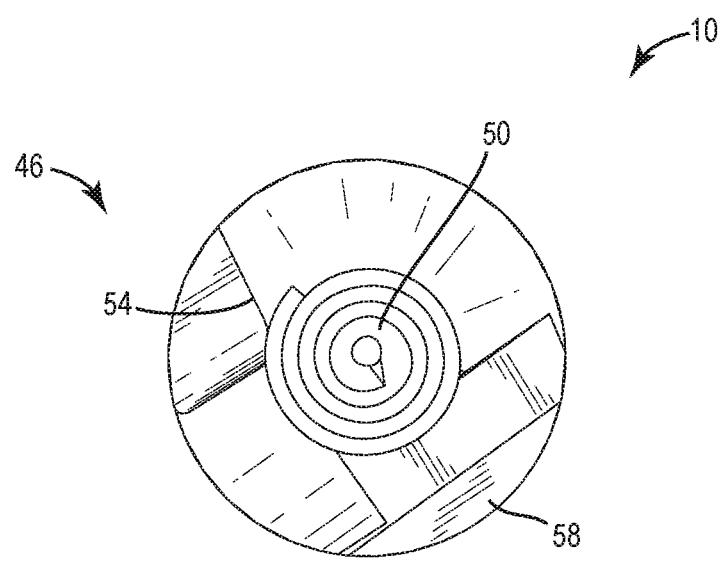
FIG. 6 is an end view of the auger of FIG. 1.

With reference to FIG. 5, the cutting head 46 of the auger 10 defines a stepped region 154 that provides stability during a drilling operation. The stepped region 154 has a maximum diameter that is greater than a maximum diameter of the body 14. In some embodiments, the minimum difference between the maximum diameter of the stepped region 154 and the maximum diameter of the body 14 is 0.5 mm. The stepped region 154 includes a step 158 where the body 14 transitions to the cutting head 46. The step 158 extends in a direction perpendicular to the axis of rotation 34 on the peripheral of the flute 30. A length 162 of the step 158 is measured between the step 158 and the tip 134 of the spur 58. A ratio of the outside diameter of the body 14 to the length 162 of the step 158 is between about 0.5 and about 1.5. In particular, for augers 10 having an outside diameter of the body 14 between 3/8" and 5/8", a ratio of the outside diameter of the body 14 to the length 162 of the step 158 is between 0.45 and 1; for augers 10 having an outside diameter of the body 14 between 11/16" and 7/8", a ratio of the outside diameter of the body 14 to the length 162 of the step 158 is between 0.77 and 0.95; and for augers 10 having an outside diameter of the body 14 between 15/16" and 1¼", a ratio of the outside diameter of the body 14 to the length 162 of the step 158 is between 0.92 and 1.55. As shown in Table 6 below, the maximum diameter of the stepped region 154, the maximum diameter of the body 14, and the length 162 of the step 158 may vary depending on the size of the auger 10.

TABLE 6

| Size | 3/8" | 1/2" | 9/16" | 5/8" | 11/16" | 3/4" | 13/16" | 7/8" |
|---|---|---|---|---|---|---|---|---|
| Maximum Stepped Region Diameter | 9.43-9.93 mm | 12.6-13.10 mm | 14.19-14.69 mm | 15.78-16.28 mm | 17.36-17.86 mm | 18.85-19.30 mm | 20.64-21.04 mm | 22.03-22.40 mm |
| Maximum Body Diameter | 8.53-8.93 mm | 11.7-12.1 mm | 13.29-13.69 mm | 14.88-15.28 mm | 16.46-16.86 mm | 17.95-18.35 mm | 19.74-20.14 mm | 21.12-21.52 mm |
| Step Length | 15-20 mm | | | | 17-22 mm | | | |

| Size | 15/16" | 1" | 1-1/16" | 1-1/8" | 1-1/4" |
|---|---|---|---|---|---|
| Maximum Stepped Region Diameter | 23.81-24.21 mm | 25.30-25.8 mm | 26.89-27.39 mm | 28.48-28.98 mm | 31.65-32.15 mm |
| Maximum Body Diameter | 22.91-23.31 mm | 24.4-24.8 mm | 25.99-26.39 mm | 27.58-27.98 mm | 30.75-31.15 mm |
| Step Length | | | 20-25 mm | | |

Figure 7:
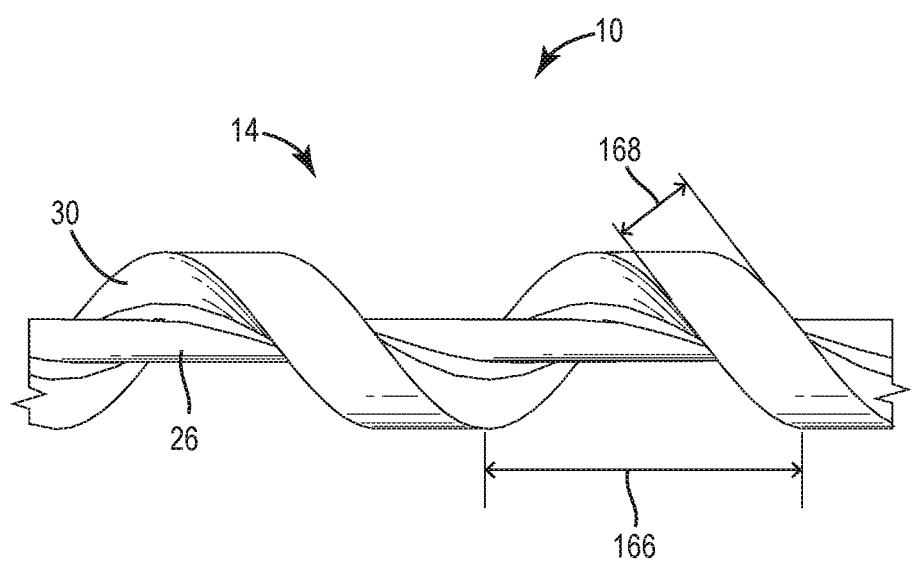
FIG. 7 is a side view of a portion of the auger of FIG. 1.

With reference to FIG. 7, the flute 30 is designed to have a maximum flute volume that facilitates chip removal. The pitch of the flute 30 is larger than previous augers to reduce the time the chips are in the flute 30. The flute 30 has a width 166 measured in a direction parallel to the axis of rotation 34. The width 166 of the flute is larger than previous augers to avoid chips becoming stuck and clogging the flute 30. The larger width 166 and pitch of the flute 30 reduce the weight of the auger 10 to reduce user fatigue. A distance 168 defined between parallel surfaces of the wraps of the flute is between a range of 8 mm and 25 mm. As shown in Table 7 below, the pitch and width 166 of the flute 30 may vary depending on the size of the auger 10.

TABLE 7

| Size | 3/8" | 1/2" | 9/16" | 5/8" | 11/16" | 3/4" | 13/16" | 7/8" | 15/16" | 1" | 1-1/16" | 1-1/8" | 1-1/4" |
|---|---|---|---|---|---|---|---|---|---|---|---|---|---|
| Flute Pitch | | 36.5-37.5 mm | | 39.5-40.5 mm | 40.5-41.5 mm | 44.5-45.5 mm | 46.5-47.5 mm | 51.5-52.5 mm | 54.5-55.5 mm | | 59.5-60.5 mm | | 66.5-67.5 mm |
| Flute Width | | 26.0-28.7 mm | | 27.0-29.7 mm | 28.0-30.7 mm | 30.0-32.7 mm | 32.0-34.7 mm | 34.0-36.7 mm | 36.0-38.7 mm | | 39.0-41.7 mm | | 42.0-44.7 mm |

In some embodiments, the auger 10 may include several coatings. For example, a top coating of a general purpose low-friction dry film lubricant may be applied to reduce friction during a drilling operation of the auger 10. In addition, a low-friction, internally reinforced coating improves abrasion resistance of the auger 10. Further, black phosphate may be used as a transition coating for improved coating adhesion to the auger 10. The coatings reduce drilling time, reduce the force needed to remove the auger 10 from a workpiece, and help wood chips eject through the flute 30.

As discussed above, the auger 10 is meant for use with a rotary tool. The rearward end 22 of the auger 10 is received in a chuck of the rotary tool. The rotary tool rotates the auger 10 clockwise towards a workpiece. When a user engages the workpiece with the auger 10, the feed screw 50 first engages the workpiece to create a pilot hole for the cutting head 46 to easily follow into. The thread 74 grasps the workpiece to provide stability during drilling. Once the feed screw 50 is engaged, the spur 58 scores a hole in the workpiece ahead of the cutting edge 54 to inhibit the edges of the hole from chipping. During drilling, the cutting edge 54 cuts (e.g., break up) material from the workpiece and directs the cut material to the flute 30 of the auger 10. As the auger 10 advances through the workpiece, the spur 58 continues to score a path for the cutting edge 54 and the cutting face 98 directs the cut material to the flute 30 for exit. Once the hole is complete, the user may retract the auger 10 from the hole and repeat as necessary.

Accordingly, providing an auger 10 with a feed screw 50 with an aggressive pitch and nonsymmetrical thread 74 increases the rotational speed of the auger 10 so a user may quickly cut holes in a workpiece while reducing the chance of the feed screw 50 from disengaging from the workpiece. Additionally, providing an auger 10 with a cutting edge 54 that has a cutting face 98 with a sharp primary cutting angle 110 reduces drag on the auger 10 to increase the rotational speed more. Further, an auger 10 with a spur 58 that extends past a cutting edge 54 allows the auger 10 to produce a clean drilling hole in a workpiece.

Various features and advantages of the invention are set forth in the following claims.

What is claimed is:

1. An auger comprising:
    a body including a first end, a second end opposite the first end, a stem that extends from the first end to the second end and defines an axis of rotation, and a flute helically wrapped around the stem;
    a shank at the first end of the body configured to be received by a power tool; and
    a cutting head at the second end of the body, the cutting head including,
        a cutting edge,
        a cutting face adjacent the cutting edge, the cutting face including a first surface portion extending from the cutting edge toward the flute, and a second surface portion extending from the first surface portion to the flute, the first surface portion being angled relative to the axis of rotation and the second surface portion being angled relative to the first surface portion,
        a back taper surface extending from the cutting edge in a direction opposite the cutting face, the back taper surface defining a back taper angle between an axis perpendicular to the axis of rotation and the back taper surface, the back taper angle being a non-zero angle, and
        a feed screw extending from the stem along the axis of rotation, the feed screw including a thread having a pitch and a depth, the pitch of the thread being larger than the depth of the thread.

2. The auger of claim 1, wherein the back taper angle matches a feed screw pitch angle.

3. The auger of claim 1, wherein the back taper angle is greater than a feed screw pitch angle.

4. The auger of claim 1, wherein the pitch of the thread is at least 2.5 mm.

5. The auger of claim 1, wherein the back taper angle is in a range between 8.2 degrees and 10 degrees.

6. The auger of claim 1, wherein a minimum distance between the back taper surface and the second surface portion is 3.5 mm.

7. The auger of claim 1, wherein the thread of the feed screw has a nonsymmetrical thread profile.

8. The auger of claim 7, wherein the thread includes a top surface facing away from the second end of the body and a bottom surface facing toward the second end of the body, wherein the top surface extends obliquely from the feed screw, and wherein the bottom surface is substantially flat.

9. An auger comprising:
    a body including a first end, a second end opposite the first end, a stem that extends from the first end to the second end and defines an axis of rotation, and a flute helically wrapped around the stem;
    a shank at the first end of the body configured to be received by a power tool; and
    a cutting head at the second end of the body, the cutting head including,
        a cutting edge,
        a cutting face adjacent the cutting edge, the cutting face including a first surface portion extending from the cutting edge toward the flute, and a second surface portion extending from the first surface portion to the flute, the first surface portion being angled relative to the axis of rotation and the second surface portion being angled relative to the first surface portion,
        a feed screw including a base connected to the stem, a tip opposite the base, and a thread, the thread having a pitch, and
        a spur extending away from the body on a diametrically opposite side of the axis of rotation from the cutting edge, the spur including a bottom adjacent the cutting head and a top opposite the bottom;
    wherein a first distance between the bottom of the spur and the base of the feed screw measured in a direction parallel to the axis of rotation is larger than the pitch of the thread of the feed screw.

10. The auger of claim 9, wherein the top of the spur extends past the cutting edge a second distance that is equal to or greater than half of the pitch of the thread of the feed screw.

11. The auger of claim 10, wherein the second distance is in a range between 1 mm and 2 mm.

12. The auger of claim 9, wherein the top of the spur extends past the base of the feed screw.

13. The auger of claim 9, wherein the pitch of the thread is at least 2.5 mm.

14. The auger of claim 9, wherein the cutting head defines a step at an interface with the body, and wherein the cutting head has a maximum diameter that is greater than a maximum diameter of the body.

15. An auger comprising:
a body including a first end, a second end opposite the first end, a stem that extends from the first end to the second end and defines an axis of rotation, and a flute helically wrapped around the stem;
a shank at the first end of the body configured to be received by a power tool; and
a cutting head at the second end of the body, the cutting head including a cutting edge, a spur, a feed screw with a thread, and a cutting face positioned adjacent the cutting edge, the cutting face including a first surface portion extending from the cutting edge toward the flute and a second surface portion extending from the first surface portion to the flute,
wherein a secondary angle measured between the second surface portion and a plane defined by the cutting edge and the axis of rotation is greater than a primary angle measured between the first surface portion and the plane; and
wherein the cutting head defines a step at an interface with the body, and wherein the cutting head has a maximum diameter that is greater than a maximum diameter of the body.

16. The auger of claim 15, wherein the thread has a nonsymmetrical thread profile.

17. The auger of claim 15, wherein the primary angle is between 30 degrees and 40 degrees, and wherein the secondary angle is between 65 degrees and 75 degrees.

18. The auger of claim 15, wherein a difference between the maximum diameter of the cutting head and the maximum diameter of the body is at least 0.5 mm.

19. The auger of claim 15, wherein the step includes a length measured between the step and a tip of the spur, and wherein a ratio of the maximum diameter of the body to the length is between approximately 0.5 and 1.5.

* * * * *